United States Patent
Raji et al.

(10) Patent No.: US 8,125,184 B2
(45) Date of Patent: Feb. 28, 2012

(54) BATTERY-BACKED POWER INTERFACE TRANSFORMER FOR LOW-POWER DEVICES

(75) Inventors: Reza Raji, Palo Alto, CA (US); Paul J. Dawes, Woodside, CA (US)

(73) Assignee: iControl Networks, Inc., Redwood City, CA (US)

( * ) Notice: Subject to any disclaimer, the term of this patent is extended or adjusted under 35 U.S.C. 154(b) by 425 days.

(21) Appl. No.: 12/551,493

(22) Filed: Aug. 31, 2009

(65) Prior Publication Data

US 2010/0052612 A1    Mar. 4, 2010

Related U.S. Application Data

(60) Provisional application No. 61/093,163, filed on Aug. 29, 2008.

(51) Int. Cl.
  *H02J 7/02* (2006.01)
  *H02J 7/00* (2006.01)
  *G05F 1/00* (2006.01)
  *F21L 4/00* (2006.01)

(52) U.S. Cl. ........ 320/111; 320/114; 320/107; 219/225; 362/183; 323/282; 323/283; 323/351; 363/125; 363/126; 363/127

(58) Field of Classification Search ............... 320/111, 320/114, 107; 219/225; 362/183; 363/125, 363/126, 127; 323/282, 283, 351
See application file for complete search history.

(56) References Cited

U.S. PATENT DOCUMENTS

| | | | |
|---|---|---|---|
| 4,754,261 A | 6/1988 | Marino | |
| 4,833,449 A | 5/1989 | Gaffigan | |
| 4,993,059 A | 2/1991 | Smith et al. | |
| 5,160,879 A * | 11/1992 | Tortola et al. | 320/111 |
| 5,717,578 A * | 2/1998 | Afzal | 320/111 |
| 5,907,279 A | 5/1999 | Bruins et al. | |
| 6,060,994 A | 5/2000 | Chen | |
| 6,134,591 A | 10/2000 | Nickles | |
| 6,281,790 B1 | 8/2001 | Kimmel et al. | |
| 6,351,829 B1 | 2/2002 | Dupont et al. | |
| 6,385,772 B1 | 5/2002 | Courtney | |
| 6,400,265 B1 | 6/2002 | Saylor et al. | |
| 6,621,827 B1 | 9/2003 | Rezvani et al. | |

(Continued)

OTHER PUBLICATIONS

Form PCT/ISA/220, ICON.P001WO, "PCT Notification of Transmittal of The International Search Report and the Written Opinion of the International Searching Authority, or the Declaration," 1 pg.

(Continued)

*Primary Examiner* — Patrick Assouad
*Assistant Examiner* — Steve T Chung
(74) *Attorney, Agent, or Firm* — Gregory & Sawrie LLP

(57) ABSTRACT

A power interface enables a low-power device to be powered from an alternating current (AC) wall receptacle or light socket with automatic backup battery charging. The power interface of an embodiment comprises a transformer module that receives an input signal. The device includes a battery module coupled to the transformer module, and the battery module includes battery charging circuitry coupled to a battery. The device comprises an output controller coupled to the transformer module and the battery module. The output controller includes detector circuitry that detects a state of the input signal. The output controller automatically controls coupling of one of a transformer module output and a battery module output to a device output according to the state of the input signal.

20 Claims, 3 Drawing Sheets

U.S. PATENT DOCUMENTS

| | | | |
|---|---|---|---|
| 6,658,091 B1 | 12/2003 | Naidoo et al. | |
| 6,661,340 B1 | 12/2003 | Saylor et al. | |
| 6,686,838 B1 | 2/2004 | Rezvani et al. | |
| 6,690,411 B2 | 2/2004 | Naidoo et al. | |
| 6,693,545 B2 | 2/2004 | Brown et al. | |
| 6,738,824 B1 | 5/2004 | Blair | |
| 6,756,998 B1 | 6/2004 | Bilger | |
| 6,778,085 B2 | 8/2004 | Faulkner et al. | |
| 6,781,509 B1 | 8/2004 | Oppedahl et al. | |
| 6,798,344 B2 | 9/2004 | Faulkner et al. | |
| 6,891,838 B1 | 5/2005 | Petite et al. | |
| 6,928,148 B2 | 8/2005 | Simon et al. | |
| 6,930,599 B2 | 8/2005 | Naidoo et al. | |
| 6,943,681 B2 | 9/2005 | Rezvani et al. | |
| 6,965,313 B1 | 11/2005 | Saylor et al. | |
| 6,970,183 B1 | 11/2005 | Monroe | |
| 6,972,676 B1 | 12/2005 | Kimmel et al. | |
| 6,975,220 B1 | 12/2005 | Foodman et al. | |
| 6,977,485 B1 * | 12/2005 | Wei | 320/139 |
| 6,990,591 B1 | 1/2006 | Pearson | |
| 7,030,752 B2 | 4/2006 | Tyroler | |
| 7,032,002 B1 | 4/2006 | Rezvani et al. | |
| 7,039,391 B2 | 5/2006 | Rezvani et al. | |
| 7,079,020 B2 | 7/2006 | Stilp | |
| 7,080,046 B1 | 7/2006 | Rezvani et al. | |
| 7,085,937 B1 | 8/2006 | Rezvani et al. | |
| 7,103,152 B2 | 9/2006 | Naidoo et al. | |
| 7,106,176 B2 | 9/2006 | La et al. | |
| 7,113,090 B1 | 9/2006 | Saylor et al. | |
| 7,113,099 B2 | 9/2006 | Tyroler et al. | |
| 7,120,232 B2 | 10/2006 | Naidoo et al. | |
| 7,120,233 B2 | 10/2006 | Naidoo et al. | |
| 7,130,383 B2 | 10/2006 | Naidoo et al. | |
| 7,149,798 B2 | 12/2006 | Rezvani et al. | |
| 7,166,987 B2 * | 1/2007 | Lee et al. | 320/114 |
| 7,183,907 B2 | 2/2007 | Simon et al. | |
| 7,218,217 B2 | 5/2007 | Adonailo et al. | |
| 7,250,854 B2 | 7/2007 | Rezvani et al. | |
| 7,254,779 B1 | 8/2007 | Rezvani et al. | |
| 7,262,690 B2 | 8/2007 | Heaton et al. | |
| 2001/0016501 A1 | 8/2001 | King | |
| 2006/0009863 A1 | 1/2006 | Lingemann | |
| 2006/0111095 A1 | 5/2006 | Weigand | |
| 2006/0206220 A1 | 9/2006 | Amundson | |
| 2006/0271695 A1 | 11/2006 | Lavian | |
| 2007/0061266 A1 | 3/2007 | Moore et al. | |
| 2007/0142022 A1 | 6/2007 | Madonna et al. | |
| 2007/0256105 A1 | 11/2007 | Tabe | |

OTHER PUBLICATIONS

Form PCT/ISA/210, ICON.P001WO, "PCT International Search Report," 2 pgs.
Form PCT/ISA/237, ICON.P001WO, "PCT Written Opinion of the International Searching Authority," 6 pgs.
Form PCT/ISA/220, ICON.P002WO, "PCT Notification of Transmittal of The International Search Report and the Written Opinion of the International Searching Authority, or the Declaration," 1 pg.
Form PCT/ISA/210, ICON.P002WO, "PCT International Search Report," 2 pgs.
Form PCT/ISA/237, ICON.P002WO, "PCT Written Opinion of the International Searching Authority," 6 pgs.
Form PCT/ISA/220, Icon.P003WO, "PCT Notification of Transmittal of the International Search Report and the Written Opinion of the International Searching Authority, or the Declaration," 1 pg.
Form PCT/ISA/210, ICON.P003WO, "PCT International Search Report," 2 pgs.
Form PCT/ISA/237, ICON.P003WO, "PCT Written Opinion of the International Searching Authority," 6 pgs.
Form PCT/ISA/220, ICON.P005WO, "PCT Notification of Transmittal of The International Search Report and the Written Opinion of the International Searching Authority, or the Declaration," 1 pg.
Form PCT/ISA/210, ICON.P005WO, "PCT International Search Report," 2 pgs.
Form PCT/ISA/237, ICON.P005WO, "PCT Written Opinion of the International Searching Authority," 7 pgs.

* cited by examiner

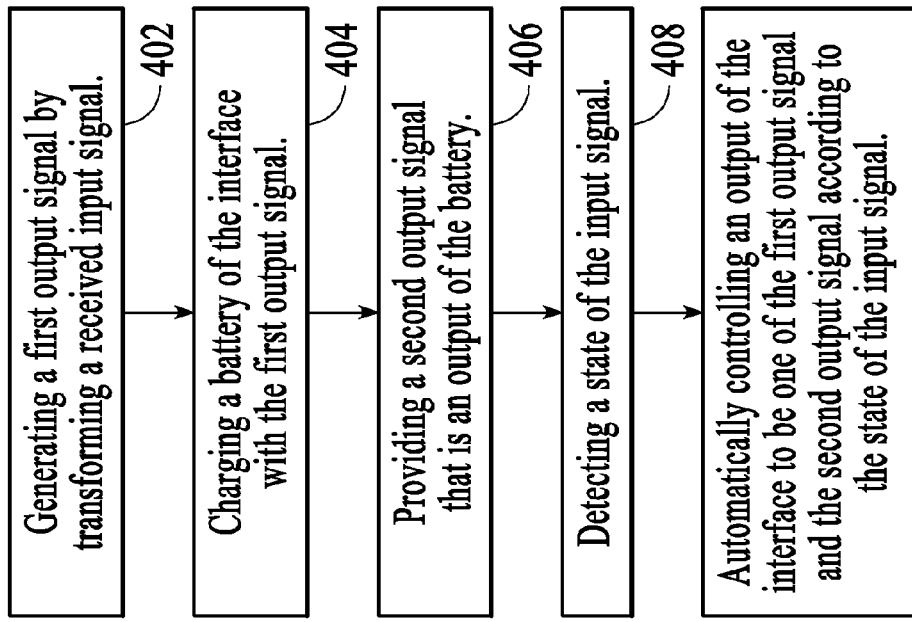
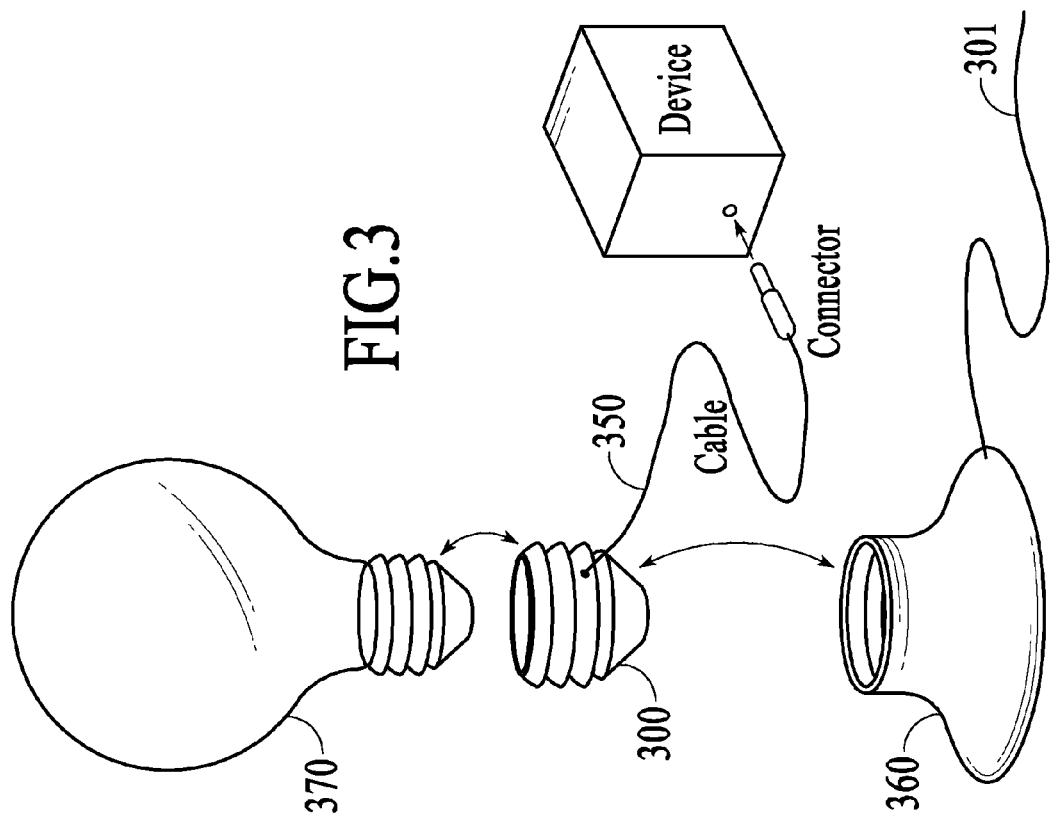

BATTERY-BACKED POWER INTERFACE TRANSFORMER FOR LOW-POWER DEVICES

RELATED APPLICATION

This application claims the benefit of U.S. Patent Application No. 61/093,163, filed Aug. 29, 2008.

TECHNICAL FIELD

The disclosure herein relates generally to power interfaces. In particular, this disclosure relates to flexible power interfaces for low-power devices such as cameras, display screens, security panels, thermostats, sensors, etc.

BACKGROUND

Conventional battery backup systems have been used in many forms, and some examples include security panels and uninterruptable power supplies (UPS) for computers. The conventional stand-alone UPS-type battery backup units are large, however, and do not facilitate placement in the locations desirable for devices such as video cameras.

In addition to conventional battery backup systems, conventional transformers for low-power devices such as video cameras are also known in the art. The conventional transformers for low-power devices also have shortcomings in that they are small and do not include battery backup.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

BRIEF DESCRIPTION OF THE DRAWINGS

FIG. 3 is a block diagram of a power interface providing a combination of battery-backup and low-power transformer in a light socket adapter, under an alternative embodiment.

FIG. 4 is a flow diagram for controlling power output of a device, under an embodiment.

DETAILED DESCRIPTION

Figure 1:
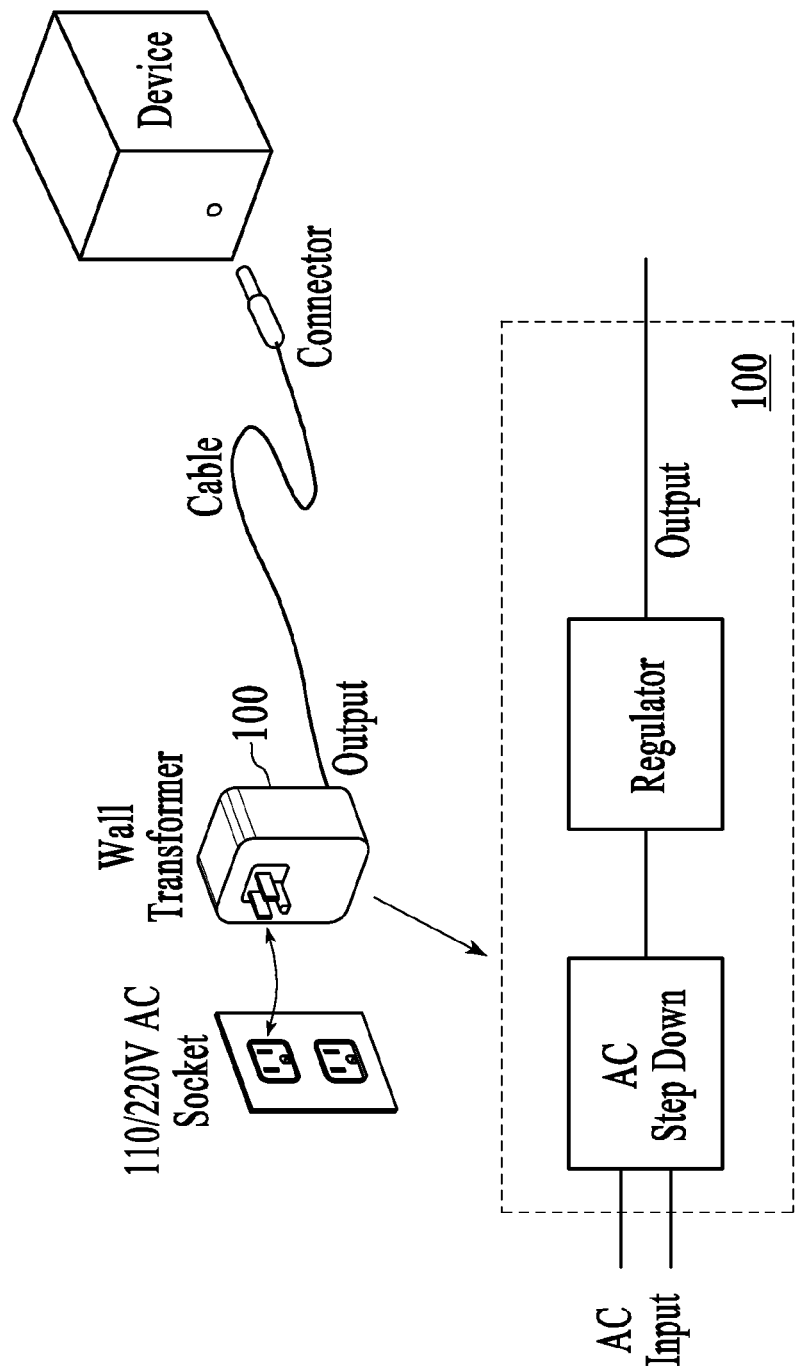
FIG. 1 is a conventional wall-powered transformer commonly used with low-power devices on the market, under the prior art.

A device or apparatus is described, referred to as a power interface, that enables a low-power device (e.g., camera, etc.) to be powered from an alternating current (AC) wall receptacle or light socket with automatic backup battery charging. The power interface of an embodiment comprises a transformer module that receives an input signal. The device includes a battery module coupled to the transformer module, and the battery module includes battery charging circuitry coupled to a battery. The device comprises an output controller coupled to the transformer module and the battery module. The output controller includes detector circuitry that detects a state of the input signal. The output controller automatically controls coupling of one of a transformer module output and a battery module output to a device output according to the state of the input signal.

The power interface includes a combination of battery-backup with low-power transformers that enable continuous operation of a compact device during a power outage. Additionally, the power interface of an embodiment provides the ability to connect a compact device to an intermittent power supply so that when the power is on the batteries charge and when the power is off the unit continues to operate for as long as permitted by the batteries. Furthermore, the power interface described herein provides the ability to provide battery-backup features in any device to which it is coupled without any modification being required to that device.

The power interface is either directly plugged into an electrical receptacle, or is connected to the receptacle using a separate cable between the unit and the receptacle. The transformer of the power interface operates or functions to step down the incoming AC voltage and to regulate the incoming signal. Additional circuitry of the power interface operates or functions to charge the built-in battery pack during normal operation (e.g., external AC power is on). If the external AC voltage is terminated or cut off, additional circuitry in the power interface switches the output of the transformer from receiving input or being fed from the internal regulator to being fed from the built-in batteries, thereby providing continuous and uninterrupted power to the coupled device.

Moreover, in the case where the main power source is switched (e.g., a device controlled by a wall switch, a light controlled by a wall switch, etc.) the power interface of an embodiment can control the state of the light through the user's on-off action on the switch. In this way, the battery inside the power interface can continue charging even if the user desires the light to be off.

The power interface described herein can be used, for example, with components of an integrated security system like any of those described in any of U.S. patent application Ser. Nos. 12/269,585, 12/197,895, 12/198,023, 12/189,757, 12/019,554, 12/019,568, 11/761,718, 11/761,745, and 11/084,232. The integrated security system described in these applications is available from iControl Networks, Inc. of Palo Alto, Calif.

In the following description, numerous specific details are introduced to provide a thorough understanding of, and enabling description for, the systems and methods described. One skilled in the relevant art, however, will recognize that these embodiments can be practiced without one or more of the specific details, or with other components, systems, etc. In other instances, well known structures or operations are not shown, or are not described in detail, to avoid obscuring aspects of the disclosed embodiments.

FIG. 1 is a conventional electrical transformer 100 typically used with low-power devices, under the prior art. The transformer is either directly plugged into an electrical receptacle or outlet in the wall ("receptacle"), or is connected to the receptacle using a separate cable between the unit and the receptacle. In either case, the conventional transformer first converts the 110/220 volt (V) alternating current (AC) voltage to a lower AC voltage level suitable for the device being powered. Depending on the requirements of the device, this low voltage AC is either directly cabled to the device, or is converted to a direct current (DC) voltage by the transformer before being cabled.

Figure 2:
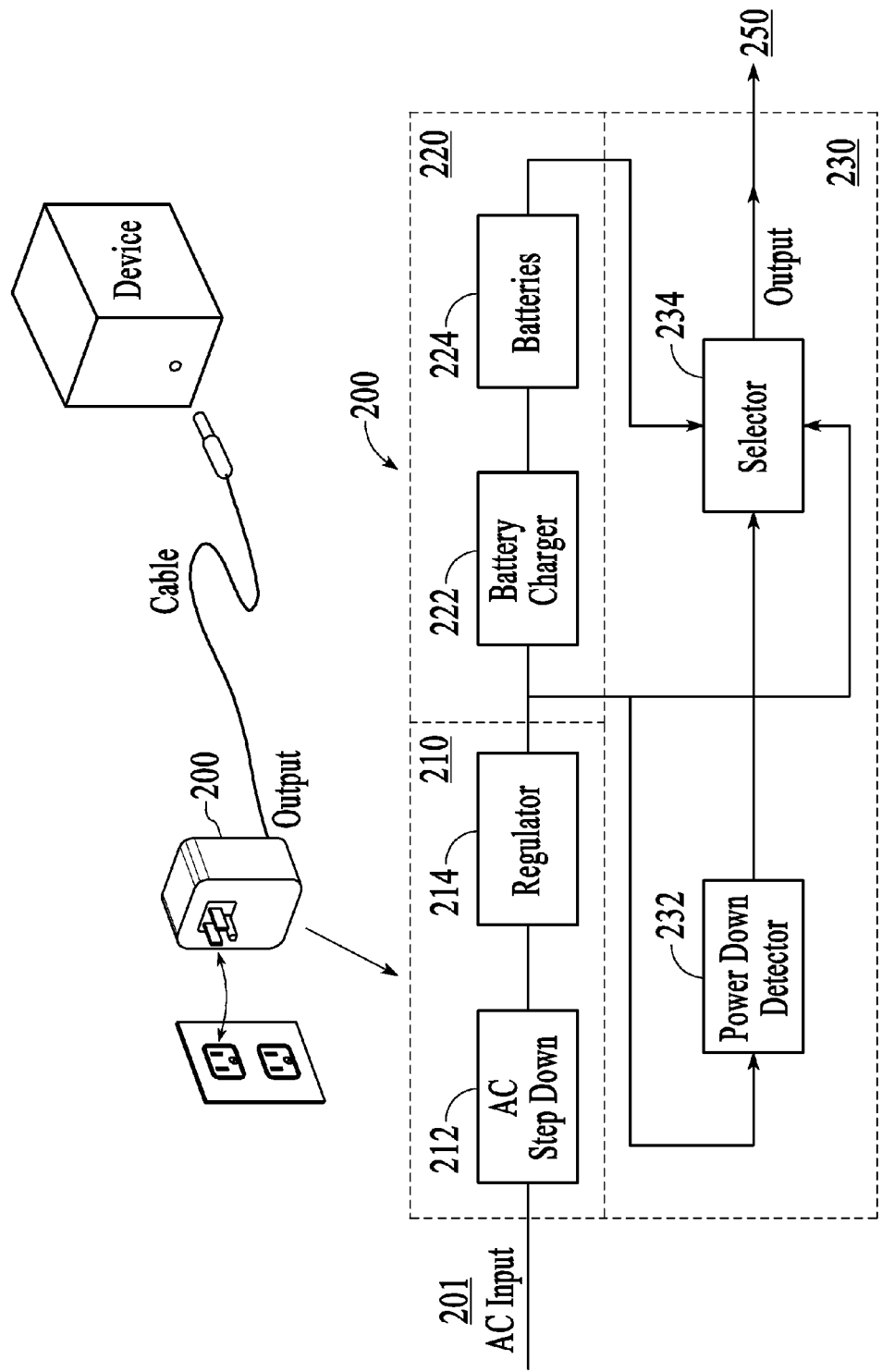
FIG. 2 is a block diagram of a power interface providing a combination of battery-backup and low-power transformer, under an embodiment.

FIG. 2 is a block diagram of a power interface 200 that provides a combination of battery-backup and low-power transforming, under an embodiment. The circuitry of the power interface 200 integrates battery backup functionality with the functionality of an electrical transformer and regulator. The power interface 200 of an embodiment is coupled or connected to an input signal 201. The input signal 201, for example, is an electrical signal such that the power interface is powered from an AC electrical source (e.g., wall receptacle, light socket, etc.).

The power interface 200 comprises a transformer module 210 that receives the input signal. The power interface 200 includes a battery module 220 coupled to the transformer module 210, and the battery module 220 includes battery charging circuitry 222 coupled to a battery 224. The power interface 200 comprises an output controller 230 coupled to the transformer module 210 and the battery module 220. The output controller 230 includes detector circuitry 232 that detects a state of the input signal, and selector circuitry 234 for controlling an output 250 of the power interface 200.

The transformer module 210 of the power interface 200 comprises transformer circuitry 212 that receives the input signal 201. The transformer circuitry 212 includes a step-down transformer that reduces a voltage of the input signal, but is not so limited. The transformer module 210 of an embodiment also includes regulator circuitry 214 coupled to the transformer circuitry 212. The regulator circuitry 214 functions to regulate the input signal as appropriate to a type and condition of the input signal and or an output signal. The transformer module 210 can include converter circuitry (not shown) to convert the input signal between AC and DC signal types, as appropriate. Additionally, the transformer module 210 can include other circuitry (e.g., filters, etc.) (not shown) as appropriate to the input signal and/or a device to which the power interface is coupled.

An output of the regulator circuitry 214 is coupled to the detector circuitry 232 and a selector 234 of the output controller 230. Additionally, an output of the regulator circuitry 214 is coupled to the battery charging circuitry 222 of the battery module 220. An output of the battery module 220 is coupled to the selector circuitry 234 of the output controller 230.

The output controller 230 automatically controls coupling of an output of one of the transformer module 210 and the battery module 220 to a device output 250 according to the state of the input signal detected by the detector circuitry 232. As an example, the selector 234 of the output controller 230 automatically couples the output of the transformer module 210 to the output 250 of the device when the state of the input signal is present. Further, when the state of the input signal is present, the battery charging circuitry 222 charges the battery 224. The selector 234 of the output controller 230 automatically couples the output of the battery module 220 to the output of the device when the state of the input signal is absent.

While the input signal 201 of the power interface of an embodiment is an AC signal, the device output 250 can be an AC signal and/or a DC signal. For example, AC-to-DC converter circuitry or DC-to-AC converter circuitry can be included in the power interface signal path, as appropriate, to provide the desired type of output signal. Alternatively, the power interface 200 of an embodiment provides both AC output signals and DC output signals using converter circuitry appropriate to both AC and DC output signals.

The power interface of an embodiment can have any number of form factors under the disclosure herein. For example, the power interface can be packaged as a separate device having input and output cables or receptacles. As another example, the power interface can be included or integrated as a component or subsystem of a host system to which it provides power.

As yet another example, the power interface can have a form factor for use in a particular application. FIG. 3 is a block diagram of a power interface 300 providing a combination of battery-backup and low-power transformation in a light socket adapter, under an alternative embodiment. The light socket adapter form factor is suitable for use in locations where an electrical receptacle is not available or a light fixture with a light socket is more convenient or closer to the device than an electrical receptacle.

The power interface 300 of this embodiment is housed in a light socket adapter, where the light socket adapter screws into a conventional electrical light socket 360. The light socket adapter housing includes a receptacle for receiving a conventional screw-in light bulb 370. The power interface 300 of this embodiment is coupled or connected to an input signal 301 via coupling with the electrical light socket 360 such that the input signal 301 is an electrical signal received via the electrical terminals of the light socket 360.

The circuitry of the power interface 300 housed in the light socket adapter is shown and described with reference to FIG. 2 above. The power interface 300 comprises a transformer module that receives the input signal. The power interface 300 includes a battery module coupled to the transformer module, and the battery module includes battery charging circuitry coupled to a battery. The power interface 300 comprises an output controller coupled to the transformer module and the battery module. The output controller includes detector circuitry that detects a state of the input signal, and selector circuitry for controlling an output 350 of the power interface 300.

The transformer module of the power interface 300 comprises transformer circuitry that receives the input signal. The transformer circuitry includes a step-down transformer that reduces a voltage of the input signal, but is not so limited. The transformer module of an embodiment also includes regulator circuitry coupled to the transformer circuitry. The regulator circuitry functions to regulate the input signal as appropriate to a type and condition of the input signal and or an output signal. The transformer module can include converter circuitry (not shown) to convert the input signal between AC and DC signal types, as appropriate. Additionally, the transformer module can include other circuitry (e.g., filters, etc.) (not shown) as appropriate to the input signal and/or a device to which the power interface is coupled.

An output of the regulator circuitry is coupled to the detector circuitry and a selector of the output controller. Additionally, an output of the regulator circuitry is coupled to the battery charging circuitry of the battery module. An output of the battery module is coupled to the selector circuitry of the output controller.

The output controller automatically controls coupling of an output of one of the transformer module and the battery module to a device output according to the state of the input signal detected by the detector circuitry. As an example, the selector of the output controller automatically couples the output of the transformer module to the output of the device when the state of the input signal is present. Further, when the state of the input signal is present, the battery charging circuitry charges the battery. The selector of the output controller automatically couples the output of the battery module to the output of the device when the state of the input signal is absent.

In this embodiment, a potential problem may arise if the light socket is controlled via a light switch (e.g., patio light being controlled by a light switch from inside the house). Thus, the light socket adapter power interface includes circuitry that allows the host light to be off without having to physically turn off the power to the light socket. For example, if the external switch is turned "OFF" and then "ON" quickly (e.g., within 1 second) then circuitry of the socket transformer interprets that switching activity and deactivates or turns the light off.

FIG. 4 is a flow diagram for controlling 400 power output of a device, under an embodiment. The controlling comprises receiving an input signal at a device, and generating a first output signal by transforming the input signal 402. The transforming comprises at least one of reducing a voltage of the input signal and regulating the voltage of the input signal. The controlling comprises charging a battery of the device with the first output signal 404. The controlling comprises providing a second output signal that is an output of the battery 406. The controlling comprises detecting a state of the input signal 408. The controlling comprises automatically controlling an output of the device to be one of the first output signal and the second output signal according to the state of the input signal 410. The automatic controlling comprises coupling the first output signal to the output of the device when the state of the input signal is present. Additionally, the charging of the battery occurs when the state of the input signal is present. The automatic controlling comprises coupling the second output signal to the output of the device when the state of the input signal is absent.

The embodiments described herein include a device comprising: a transformer module that receives an input signal; a battery module coupled to the transformer module, the battery module comprising battery charging circuitry coupled to a battery; and an output controller coupled to the transformer module and the battery module, wherein the output controller comprises detector circuitry that detects a state of the input signal, wherein the output controller automatically controls coupling of one of a transformer module output and a battery module output to a device output according to the state of the input signal.

The transformer module of an embodiment comprises transformer circuitry, wherein the transformer circuitry receives the input signal.

The transformer circuitry of an embodiment comprises a step-down transformer that reduces a voltage of the input signal.

The transformer module of an embodiment comprises regulator circuitry coupled to the transformer circuitry.

Regulator circuitry output of an embodiment is coupled to the detector circuitry and the output controller.

The battery charging circuitry of an embodiment is coupled to the regulator circuitry.

The input signal of an embodiment is an alternating current (AC) signal.

The device output of an embodiment is an alternating current (AC) signal.

The device output of an embodiment is a direct current (DC) signal.

The embodiments described herein include a device comprising: transformer circuitry, wherein the transformer circuitry receives an input signal; regulator circuitry coupled to the transformer circuitry; a battery module coupled to the regulator circuitry, the battery module comprising battery charging circuitry coupled to a battery; and an output controller, wherein a first input of the output controller is coupled to a power output of the regulator circuitry, wherein a second input of the output controller is coupled to a battery output of the battery module, wherein the output controller automatically switches one of the power output and the battery output as a device output according to a state of the input signal.

The device of an embodiment comprises a detector coupled to the regulator circuitry and the output controller, wherein the detector provides a control signal to the controller in response to a detected state of the input signal.

The transformer circuitry of an embodiment comprises a step-down transformer that reduces a voltage of the input signal.

The input signal of an embodiment is an alternating current (AC) signal.

The device output of an embodiment is an alternating current (AC) signal.

The device output of an embodiment is a direct current (DC) signal.

The embodiments described herein include a method comprising: receiving an input signal at a device; generating a first output signal by transforming the input signal; charging a battery of the device with the first output signal; providing a second output signal that is an output of the battery; detecting a state of the input signal; and automatically controlling an output of the device to be one of the first output signal and the second output signal according to the state of the input signal.

Automatically controlling of an embodiment comprises coupling the first output signal to the output of the device when the state of the input signal is present.

The charging of the battery of an embodiment occurs when the state of the input signal is present.

Automatically controlling of an embodiment comprises coupling the second output signal to the output of the device when the state of the input signal is absent.

The transforming of an embodiment comprises reducing a voltage of the input signal.

The transforming of an embodiment comprises regulating the voltage of the input signal.

The input signal of an embodiment is an alternating current (AC) signal, and the output of the device of an embodiment is one of an alternating current (AC) signal and a direct current (DC) signal.

The embodiments described herein include and/or run under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, cellular telephones, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components of the systems described herein, and/or provided by some combination of algorithms. The methods described herein can be implemented in one or more of software algorithm(s), programs, firmware, hardware, components, circuitry, in any combination.

The components described herein can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include: microcontrollers with memory (such as electronically erasable programmable read only memory (EEPROM)), embedded microprocessors, firmware, software, etc. Furthermore, aspects of the systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, HTTPs, FTP, SMTP, WAP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the systems and methods is not intended to be exhaustive or to limit the systems and methods to the precise forms disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the embodiments to the specific embodiments disclosed in the specification and the claims, but should be construed to include all systems that operate under the claims. Accordingly, the embodiments are not limited by the disclosure herein, but instead the scope of the embodiments is to be determined entirely by the claims.

While certain aspects of the embodiments are presented below in certain claim forms, the inventors contemplate the various aspects of the embodiments in any number of claim forms. Accordingly, the inventors reserve the right to add additional claims after filing the application to pursue such additional claim forms for other aspects of the embodiments.

What is claimed is:

1. A device comprising:
a step-down transformer module that receives an input signal;
a battery module coupled to the transformer module, the battery module comprising battery charging circuitry coupled to a battery; and
an output controller coupled to the transformer module and the battery module, wherein the output controller comprises detector circuitry that detects a state of the input signal, wherein the output controller automatically controls coupling of one of a transformer module output and a battery module output to a device output according to the state of the input signal.

2. The device of claim 1, wherein the transformer module comprises transformer circuitry, wherein the transformer circuitry receives the input signal.

3. The device of claim 2, wherein the transformer module comprises regulator circuitry coupled to the transformer circuitry.

4. The device of claim 3, wherein a regulator circuitry output is coupled to the detector circuitry and the output controller.

5. The device of claim 3, wherein the battery charging circuitry is coupled to the regulator circuitry.

6. The device of claim 1, wherein the input signal is an alternating current (AC) signal.

7. The device of claim 1, wherein the device output is an alternating current (AC) signal.

8. The device of claim 1, wherein the device output is a direct current (DC) signal.

9. A device comprising:
step-down transformer circuitry, wherein the transformer circuitry receives an input signal;
regulator circuitry coupled to the transformer circuitry;
a battery module coupled to the regulator circuitry, the battery module comprising battery charging circuitry coupled to a battery; and an output controller, wherein a first input of the output controller is coupled to a power output of the regulator circuitry, wherein a second input of the output controller is coupled to a battery output of the battery module, wherein the output controller automatically switches one of the power output and the battery output as a device output according to a state of the input signal.

10. The device of claim 9, comprising a detector coupled to the regulator circuitry and the output controller, wherein the detector provides a control signal to the controller in response to a detected state of the input signal.

11. The device of claim 9, wherein the input signal is an alternating current (AC) signal.

12. The device of claim 9, wherein the device output is an alternating current (AC) signal.

13. The device of claim 9, wherein the device output is a direct current (DC) signal.

14. A method comprising:
receiving an input signal at a device;
generating a first output signal by step-down transforming the input signal;
charging a battery of the device with the first output signal;
providing a second output signal that is an output of the battery;
detecting a state of the input signal; and
automatically controlling an output of the device to be one of the first output signal and the second output signal according to the state of the input signal.

15. The method of claim 14, wherein automatically controlling comprises coupling the first output signal to the output of the device when the state of the input signal is present.

16. The method of claim 15, wherein the charging of the battery occurs when the state of the input signal is present.

17. The method of claim 15, wherein automatically controlling comprises coupling the second output signal to the output of the device when the state of the input signal is absent.

18. The method of claim 14, wherein the transforming comprises reducing a voltage of the input signal.

19. The method of claim 18, wherein the transforming comprises regulating the voltage of the input signal.

20. The method of claim 14, wherein the input signal is an alternating current (AC) signal, and the output of the device is one of an alternating current (AC) signal and a direct current (DC) signal.

* * * * *